United States Patent [19]
Nielsen et al.

[11] Patent Number: 5,594,828
[45] Date of Patent: Jan. 14, 1997

[54] INVENTION USING FIBER OPTICS FOR LIGHT PATH FROM CLOSE PROXIMITY TO AN IMAGE TO AN AREA ARRAY IMAGE SENSOR

[75] Inventors: Kenneth R. Nielsen; Paul Bonomo, both of Loveland; Gene Pien, Fort Collins, all of Colo.

[73] Assignee: Hewlett-Packard Company, Palo Alto, Calif.

[21] Appl. No.: 411,135

[22] Filed: Mar. 27, 1995

[51] Int. Cl.$^6$ .................................................... G02B 6/04
[52] U.S. Cl. ........................ 385/121; 385/901; 385/127; 250/227.1
[58] Field of Search ................................. 385/121, 115, 385/120, 126, 901, 123–128; 362/32; 250/227.11, 227.12, 227.26

[56] References Cited

U.S. PATENT DOCUMENTS

| | | | |
|---|---|---|---|
| 4,593,973 | 6/1986 | Yoshida et al. | 385/126 |
| 4,760,421 | 7/1988 | Margolin | 385/115 X |
| 4,932,747 | 6/1990 | Russell et al. | 385/121 X |
| 5,155,790 | 10/1992 | Hwang et al. | 385/121 |
| 5,347,122 | 9/1994 | Ansorge et al. | 385/120 X |

*Primary Examiner*—John D. Lee
*Assistant Examiner*—Phan T. H. Palmer

[57] ABSTRACT

Apparatus for producing data signals relating to light reflected by an illuminated object may include a fiber optic bundle having a plurality of optic fibers, each of the optic fibers having a light input end and a light output end. The light input ends of the optic fibers are substantially coplanar and are arranged adjacent one another in a generally linear configuration so that they define a line. The light output ends of the optic fibers are also substantially coplanar, but are arranged adjacent one another in a generally rectangular configuration so that they define a rectangle. Detector apparatus operatively connected to the light output ends of the optic fibers produces data signals that correspond to light received from the light output ends of the optic fibers.

4 Claims, 4 Drawing Sheets

INVENTION USING FIBER OPTICS FOR LIGHT PATH FROM CLOSE PROXIMITY TO AN IMAGE TO AN AREA ARRAY IMAGE SENSOR

BACKGROUND

This invention relates to image scanning devices in general and more specifically to apparatus for directing light reflected from an illuminated object onto a photosensor.

Optical scanners produce data signals representative of an object or document being scanned by projecting an image of the document onto an optical photosensor. The electrical signals produced by the optical photosensor may then be digitized and processed as necessary to produce an image of the scanned object on a suitable display device, such as, for example, the display of a personal computer. If the object being scanned is text, then the data signals may be converted into text data by a suitable optical character recognition (OCR) program or device.

Most optical scanners use illumination and optical systems to illuminate the object and focus a small area of the illuminated object, usually referred to as a "scan line," onto the optical photosensor. For example, an optical scanner for scanning written documents may utilize a narrow scan line with a length corresponding to the maximum document width to be scanned, e.g., 9 inches or so. The entire object is then scanned by sweeping the illuminated scan line across the object, either by moving the object with respect to the illumination and optical assemblies or by moving the illumination and optical assemblies relative to the object.

A typical scanner optical system will include a slit aperture and lens assembly to focus the image of the scan line onto the surface of the photosensor. Depending on the particular design, the scanner optical system may also include a plurality of mirrors to "fold" the path of the light beam, thus allowing the optical system to be conveniently mounted within a relatively small enclosure. In order to allow a smaller photosensor array to be used, most optical systems also reduce the size of the image of the scan line that is focused onto the surface of the photosensor. For example, many optical systems have a lens reduction ratio of about 8:1, which reduces the size of the image of the scan line by a factor of about 8.

The most common type of photosensor device used in optical scanners is the charge coupled device or CCD. A CCD may comprise a large number of light sensitive cells or "pixels," each of which collects or accumulates an electrical charge in response to light. Since the size of the accumulated electrical charge in any given cell or pixel is related to the intensity and duration of the light exposure, a CCD may be used to detect light and dark spots on an image focused thereon. In a typical scanner application, the charge accumulated in each of the CCD cells or pixels is measured and then discharged at regular intervals known as sampling intervals, which may be about 5 milliseconds or so for a typical scanner.

In most optical scanner applications using a long, narrow scan line each of the individual pixels in the CCD are arranged end-to-end, thus forming a linear array. Each pixel in the CCD array thus corresponds to a related pixel portion of the elongate scan line. The individual pixels in the linear photosensor array are generally aligned along a "cross" direction, i.e., a direction perpendicular to the direction of movement of the illuminated scan line across the object. The direction of movement of the illuminated scan line across the object is known as the "scan direction." Each pixel of the linear photosensor array thus has a length measured in the cross direction and a width measured in the scan direction. In most CCD arrays the length and width of the pixels are equal, typically being about 8 microns or so in each dimension.

As mentioned above, each pixel in the CCD array corresponds to a related pixel portion of the elongate scan line on the object. To avoid confusion, the corresponding pixel portion on the elongate scan line will be referred to herein as an "native object pixel." A native object pixel has dimensions equal to the dimensions of the corresponding pixel on the linear photosensor array multiplied by the lens reduction ratio of the optical system. For example, in a scanner having a CCD pixel size of 8 microns by 8 microns and a lens reduction ratio of 8:1, the size of the native object pixels will be about 64 microns by 64 microns. Also, the linear array of native object pixels that corresponds to the linear array of CCD pixels will be referred to herein as a "native scan line."

While optical scanners of the type described above are widely used, they are not without their disadvantages. For example, the optical systems used in such scanners generally employ several optical elements which may be expensive to manufacture and difficult to align. For example, the lens assembly used to focus the image of the illuminated scan line onto the surface of the photodetector may represent a significant portion of the overall cost of the scanner device. Of course, if low cost lens assemblies are used, the cost savings usually comes at the expense of increased image aberrations, such as astigmatism, coma, etc., which have the effect of decreasing the overall image quality. Many optical scanners also use mirror assemblies to fold the path of the light beam. While such mirror assemblies have the advantage of allowing the optical system to be mounted within a relatively small enclosure, they may be difficult to align and may impose strict geometrical relationships between the various components of the scanner.

Another disadvantage associated with the image scanning devices of the type described above is that the linear CCD arrays are relatively expensive, and only a few different configurations are currently available from manufacturers. Further, since it is not practical to construct linear CCDs with lengths even approaching the length of a typical scan line, which may be about 9 inches, the optical system must have a fairly high lens reduction ratio in order to reduce the length of the image of the illuminated scan line to allow reasonably short detector lengths, on the order of about 1 inch or so. Unfortunately, however, high lens reduction ratios tend to reduce the native resolution of the scanner. For example, an optical scanner having a CCD with a pixel size of 8×8 microns and a lens reduction ratio of 8 will have native object pixels of about 64×64 microns. Therefore, the lens reduction ratio imposes a limit on the maximum native resolution that can be achieved by a given CCD photodetector.

Consequently, there remains a need for an optical scanner having a simplified system for directing an image of the illuminated scan line onto the surface of a photodetector. Ideally, such a simplified optical system would eliminate the need for the slit aperture and lens assemblies, as well as the need to resort to relatively complex and difficult to align mirror systems. Additional utility could be realized if the effective lens reduction ratio could be decreased, thus decreasing the size of the native object pixels and increasing the native resolution of the scanner.

SUMMARY OF THE INVENTION

Apparatus for producing data signals relating to light reflected by an illuminated object may include a fiber optic bundle having a plurality of optic fibers, each of the optic fibers having a light input end and a light output end. The light input ends of the optic fibers are substantially coplanar and are arranged adjacent one another in a generally linear configuration so that they define a line. The light output ends of the optic fibers are also substantially coplanar, but are arranged adjacent one another in a generally rectangular configuration so that they define a rectangle. Detector apparatus operatively connected to the light output ends of the optic fibers produces data signals that correspond to light received from the light output ends of the optic fibers.

A significant advantage of the fiber optic bundle is that it dispenses with the need to use expensive and cumbersome lens and mirror assemblies, with all their associated disadvantages, such as complexity and problems associated with aligning the various components. The fiber optic bundle also eliminates the need for linear photosensor arrays, since the image from an elongate scan line may be projected onto a two-dimensional photosensor array having a surface area equivalent to the surface area of the elongate scan line defined by the linear input end. The fiber optic bundle also provides the additional advantage of allowing several two-dimensional photosensor arrays to be used to produce image data from a single scan line. For example, if the surface area of the scan line defined by the linear input end exceeds the surface area available on a single two-dimensional photosensor array, the optic fibers comprising fiber optic bundle may be organized into a plurality of rectangular light output ends, thus allowing a corresponding number of two-dimensional photosensor arrays to be used.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
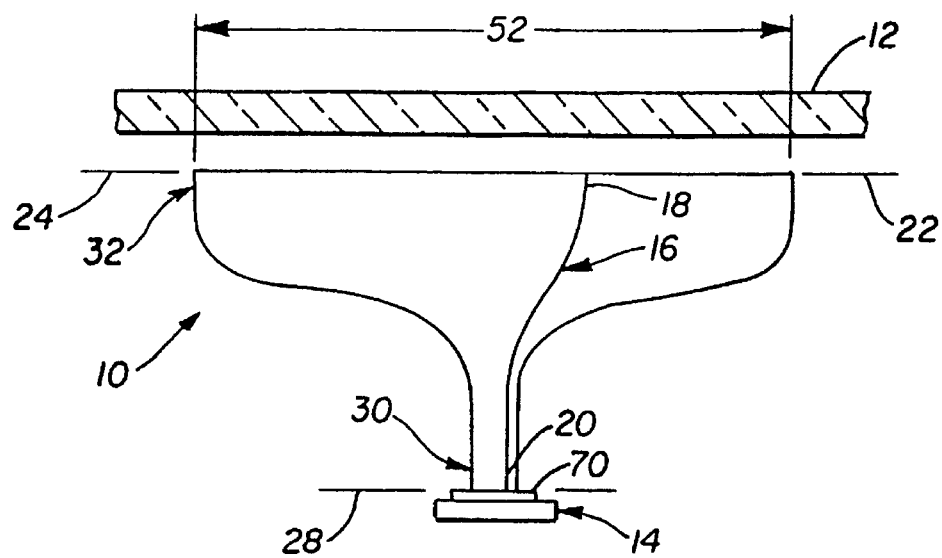
FIG. 1 is a schematic view in elevation of a fiber optic bundle and photosensor array as they could be used in an optical scanner system.
Figure 2:
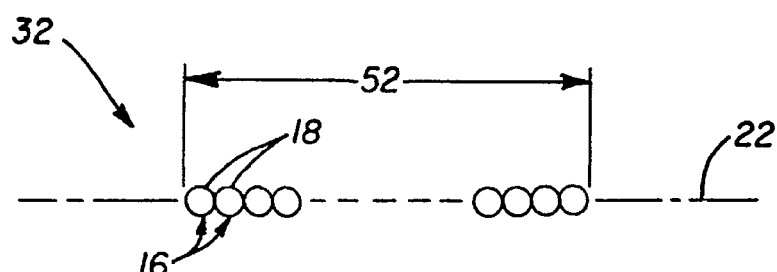
FIG. 2 is a plan view of the linear input end of the fiber optic bundle showing the linear alignment of the light input ends of the individual optic fibers.

A fiber optic bundle 10 is shown in FIG. 1 as it could be used in optical scanner apparatus to direct light reflected from an illuminated object (not shown) positioned above a transparent platen 12 onto the light sensitive cells of a two-dimensional photosensor array, such as a CCD 14. Fiber optic bundle 10 may comprise a plurality of optic fibers 16 (only one of which is shown in FIG. 1), each of which includes a light input end 18 and a light output end 20. The light input ends 18 of the fibers 16 are arranged adjacent one another in a generally linear configuration so that the ends 18 define a linear input end 32, as best seen in FIG. 2. The light output ends 20 of each optic fiber 16 are randomly arranged adjacent one another in a generally rectangular configuration so that the ends 20 define a rectangular output end 30. See Figure 3. The fiber optic bundle 10 may be located within the scanner apparatus so that the linear input end 32 is positioned adjacent the transparent platen 12, while the rectangular output end 30 is positioned over the light sensitive cells of the two-dimensional CCD array 14.

Figure 4:
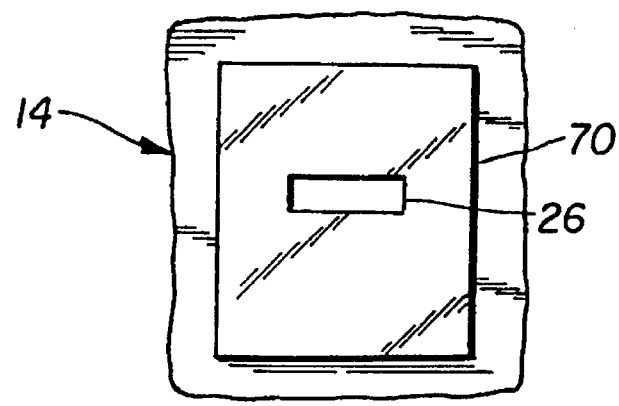
FIG. 4 is a plan view showing the approximate position of the rectangular output end of the fiber optic bundle on the transparent window covering a two-dimensional photosensor array.
Figure 5:
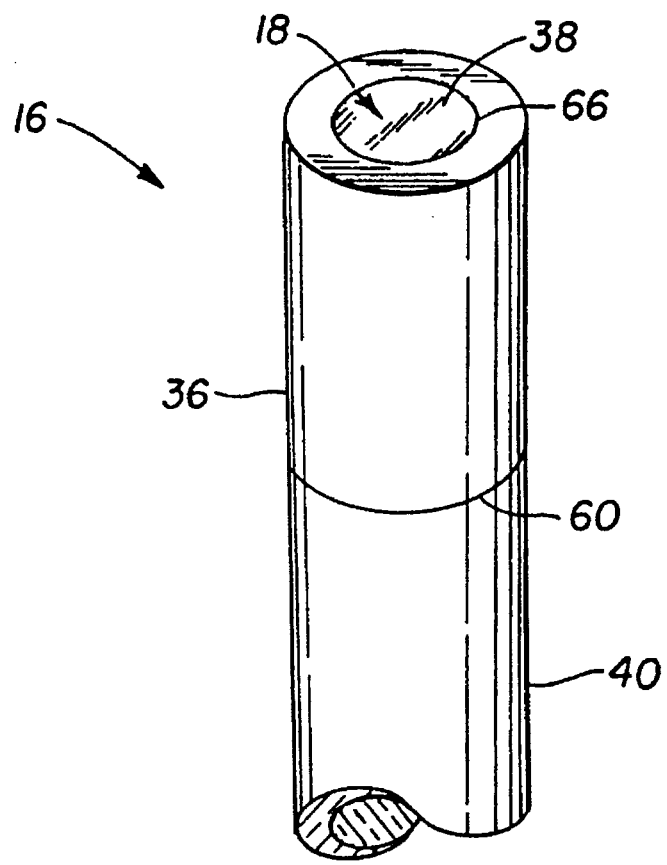
FIG. 5 is a perspective view of the light input end and light absorbing sheath of an optic fiber.

The linear input end 32 of fiber optic bundle 10 defines an elongate scan line. That is, the linear arrangement of the fibers is such that, in combination, they "see" an elongate line, the width of which is approximately equal to the diameters 86 (FIG. 7) of the fibers 16 and the length of which is approximately equal to the overall length 52 of the linear input end 32. In order to reduce the amount of image overlap between adjacent fibers 16, the light input end 18 of each optic fiber 16 includes a light absorbing sheath 36 (FIG. 4), which significantly reduces the aperture or "field of view" of the fiber, as best seen in FIG. 5. The reduced field of view of the fiber 16 reduces the amount of image overlap between adjacent fibers, thus significantly increasing resolution.

Figure 3:
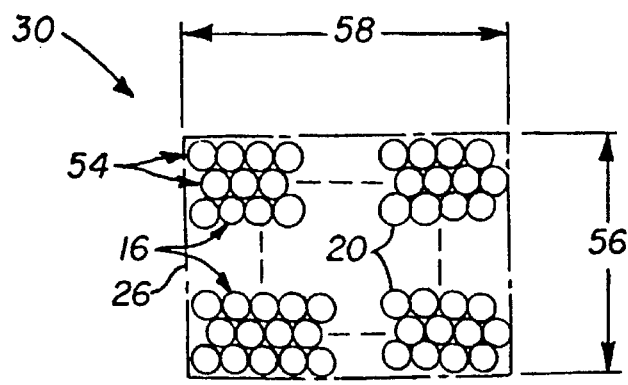
FIG. 3 is a plan view of the rectangular output end of the fiber optic bundle showing the rectangular arrangement of the light output ends of the individual optic fibers.

The light output ends 20 of the optic fibers 16 are brought together in a random fashion to form rectangular output end 30, as best seen in FIG. 3, which is positioned over the light sensitive cells 72 (FIG. 8) of a two-dimensional photosensor array, such as CCD 14. CCD 14 converts the light received from the optic fibers 16 into electrical signals. However, because the fibers 16 comprising the rectangular output end 30 are brought together in a random fashion, there is a like randomness in the correspondence between the light input ends 18 and the light output ends 20 of the optic fibers 16. Put in other words, to optic fibers 16 having adjacent light input ends 18 may have their respective output ends 20 positioned at opposite sides of the rectangular output end 30. Consequently, adjacent pixels in the scan line defined by the linear input end 32 may not be projected to adjacent light sensitive cells,72 (FIG. 8) on the CCD.

The random, yet fixed, correspondence between the light input ends 18 and the light output ends 20 of fibers 16 is compensated for by the control system 34 (FIG. 8), which is programmed to correlate the electrical signals from the CCD array 14 with their corresponding native object pixels for the particular fiber optic bundle 10, as will be explained in greater detail below.

Figure 8:
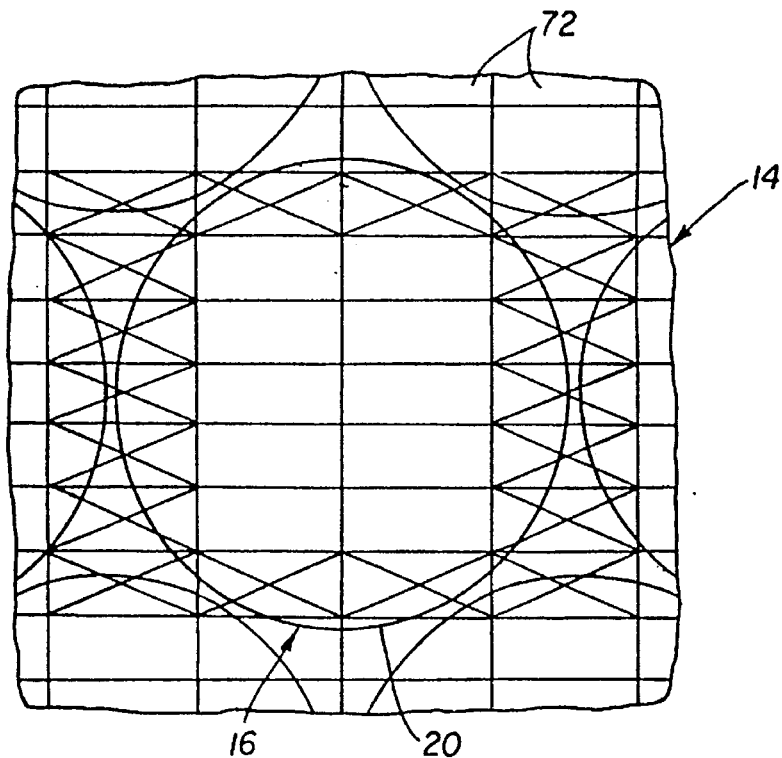
FIG. 8 is a plan view showing the relationship of the light output ends of the optic fibers with respect to the individual light sensitive cells in the two-dimensional photosensor array.

Briefly, the control system 34 shown in FIG. 8 comprises a central processing unit or CPU 42 that controls the CCD array 14, a programmable read-only memory or PROM 44, and a memory device, such as random access memory (RAM) 46. The PROM 44 may be programmed during production with a set of correlation parameters required to correlate the image data received from the light output end 30 of the specific fiber optic bundle 10. That is, the PROM 44 may be programmed to correlate the electrical signals produced by the CCD array 14 with the particular native object pixel from which the signals were derived. The correlated image data is then stored in RAM 46 where it may be accessed by an optical data processing system (not shown) and processed as if the correlated image data were originally derived from a scanner having a conventional optical system with a linear CCD array and correlated data signals.

Optical scanner apparatus employing the fiber optic bundle 10 and two-dimensional linear photosensor array 14 described above may be similar to a conventional optical scanner apparatus, but with a few important differences. For example, the fiber optic bundle 10 may be mounted in place of the lens and mirror assembly used in a conventional optical scanner. However, since the linear input end 32 of fiber optic bundle 10 defines an elongate scan line, as described above, optical scanner apparatus utilizing the fiber optic bundle 10 does not require a slit aperture assembly. Also, the rectangular output end 30 allows a two-dimensional photosensor array to be used in place of the linear photosensor array typically used in conventional scanner apparatus. Of course, the optical scanner would also include a control system 34 as substantially described herein to correlate the image data.

The entire object may then be scanned in a conventional manner by sweeping the scan line across the object, either by moving the object with respect to the linear input end 32 of fiber optic bundle 10 or by moving the linear input end 32 relative to the object. The fiber optic bundle 10 directs the light received by the linear input end 32 onto the light sensitive surface of the two-dimensional CCD array 14. The control system 34 correlates the electrical signals produced by the CCD array 14 so that they correspond to the native object pixels, thus allowing any subsequent data processing apparatus (not shown) to use the data in the same manner as if they were generated by a linear CCD array.

A significant advantage of the fiber optic bundle 10 is that it dispenses with the need to use expensive and cumbersome lens and mirror assemblies, with all their associated disadvantages, such as relative complexity and problems associated with aligning the various components. The fiber optic bundle 10 also eliminates the need for linear photosensor arrays, since the image from an elongate scan line may be projected onto a two-dimensional photosensor array having a surface area equivalent to the surface area of the elongate scan line defined by the linear input end 32. The fiber optic bundle 10 also provides the additional advantage of allowing several two-dimensional photosensor arrays to be used to produce image data from a single scan line. For example, if the surface area of the scan line defined by the linear input end 32 exceeds the surface area available on a single two-dimensional photosensor array, the optic fibers comprising fiber optic bundle 10 may be organized into a plurality of rectangular light output ends 30, thus allowing a corresponding number of two-dimensional photosensor arrays to be used.

The details of the fiber optic bundle 10 are best seen by referring to FIGS. 1–3 simultaneously. As was briefly described above, fiber optic bundle 10 comprises a plurality of individual optic fibers 16, each of which includes a light input end 18 and a light output end 20. The light input ends 18 are arranged adjacent one another so that they define a line 22 contained within light input plane 24. The overall length 52 of the linear input end 32 is equal to the number of individual fibers multiplied by the center-to-center distance between adjacent fibers, which may be equal to or greater than the diameter 86 (FIG. 7) of the fibers 16. In one preferred embodiment, fiber optic bundle 10 comprises 3600 individual optic fibers, each of which has a diameter of about 62.5 microns. Consequently, the overall length 52 of the linear input end 32 is about 228.54 mm (9 inches).

The light output ends 20 of the fibers 16 are brought together in a random fashion and define the rectangular output end 30. Referring now to FIG. 3, the output ends 20 of fibers 16 are arranged so that they roughly define a rectangle 26 which is contained within a light output plane 28 (FIG. 1). The rectangle 26 defined by the light output ends 20 may be sized to correspond to the size of the light sensitive area on the two-dimensional photosensor array 14. For example, in the embodiment wherein the fiber optic bundle 10 comprises 3600 individual optic fibers 16, the rectangular output end 30 is arranged so that it comprises thirty-six (36) rows 54 of one-hundred (100) fibers 16 each. So arranged, the rectangle 26 defined by the light output ends 20 of fibers 16 has a width 56 of about 1.89 mm (0.075 inches) and a length 58 of about 6.22 mm (0.25 inches), which approximately corresponds to the area of light sensitive cells 72 (FIG. 8) on the CCD array 14. The rectangular light output end 30 may then be secured to the transparent cover 72 on the CCD array 14, as best seen in FIG. 4, by any convenient means, such as a transparent adhesive (not shown).

Referring now to FIG. 5, each optic fiber 16 comprises a light transmitting core 38 surrounded by a light absorbing sheath 36 and a cladding 40. The light absorbing sheath 36 extends from the light input end 18 of light transmitting core 38 to a terminus 60 and comprises a light absorbing material having an index of refraction that is greater than the index of refraction of the light transmitting core 38. The cladding 40 extends from the terminus 60 all the way to the light output end 20 (not shown in FIG. 4) and comprises a material having an index of refraction that is less than the index of refraction of the light transmitting core 38. Therefore, that portion of the optic fiber 16 that is surrounded by cladding 40 transmits light by means of total internal reflection. In one preferred embodiment, the light transmitting core 38 comprises optic grade glass fiber. The entire fiber 16 may be surrounded by a protective jacket (not shown) to protect the light absorbing sheath 36 and cladding 40 from damage.

Figure 6:
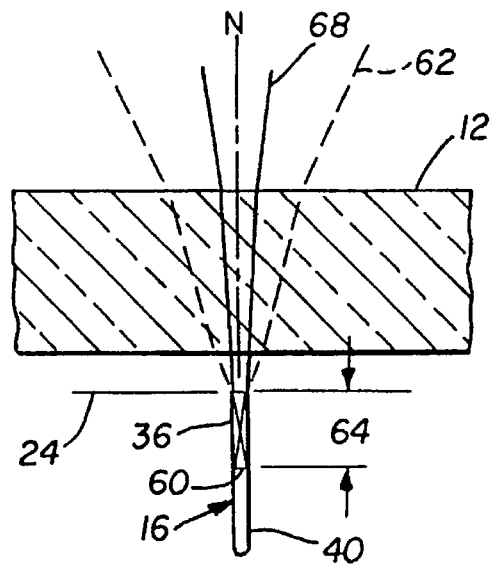
FIG. 6 is a schematic view in elevation of an optic fiber showing how the light absorbing sheath reduces the field of view of the fiber.
Figure 7:
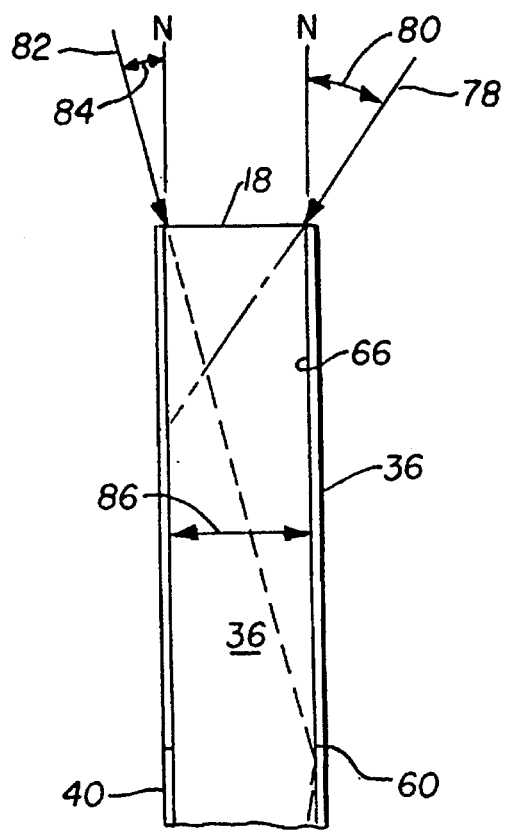
FIG. 7 is an enlarged view in elevation of the optic fiber shown in FIG. 6.

Referring now to FIGS. 6 and 7, the light absorbing sheath 36 reduces the effective aperture or field of view of the fiber 16 from a wide field 62 to a much smaller field of view 68 by absorbing light that is incident on the light input end 18 at large angles with respect to the normal N. More specifically, a light ray 78 incident on the light input end 18 of fiber 16 at a relatively large angle 80 with respect to normal N enters the light transmitting core 38 and travels through core 38 until it encounters the boundary 66 between the core 38 and light absorbing sheath 36. Since the index of refraction of the light absorbing sheath 36 is greater than the index of refraction of the light transmitting core 38, the light ray 78 will pass through boundary 66 and enter the light absorbing sheath 36, where it is absorbed. On the other hand, another light ray 82 incident on the light input end 18 at a relatively small angle 84 with respect to normal N enters the light transmitting core 38 and travels through the core until it encounters the boundary 66 between the core 38 and cladding 40. However, since the index of refraction of the cladding 40 is less than the index of refraction of the light transmitting core 38, the light ray 82 will be reflected from boundary 66 and will continue to be transmitted through core 38 by means of total internal reflection.

The light absorbing sheath 36 therefore functions as a collimator to reduce the effective aperture or field of view of the fiber 16 from a relatively wide field of view 62 to a smaller field of view 68 (FIG. 6). The reduction in field of view significantly reduces the amount of image "cross talk" between adjacent fibers, i.e., native object pixels, which results in a substantial increase in resolution.

The size of the effective aperture, i.e., field of view 68, of the optic fiber 16 is inversely related to the overall length 64 of the light absorbing sheath 36, i.e., the distance between the light input end 18 and the terminus 60. Longer overall lengths 64 will reduce the field of view 68, while shorter lengths will increase the field of view 68. Since the desired size of the field of view 68 is usually dependent on the spacing between the input ends 18 of the fibers 16 and the object being scanned, as well as on the desired image characteristics, no one field of view, thus length 64, can be considered as optimum for all installations. Finally, it is important that the section of the fiber 16 that is coated with the light absorbing sheath 36 (i.e., length 64) be substantially straight with no bends or curves.

Other configurations are possible to reduce the effective aperture or field of view of the fiber 16. For example, it is not necessary to use fibers having a light absorbing sheath 36 if the ends 18 of the fibers 16 are positioned closer to the object being scanned. Alternatively, the input ends 18 of the fibers 16 may be spaced apart slightly, so that the field of view 62 of a given fiber 16 does not significantly overlap the field of view of adjacent fibers. Still another configuration would comprise a combination of the foregoing configurations, i.e., optic fibers 16 having their input ends 18 closer to the object as well as having their input ends 18 spaced-apart slightly to prevent image overlap.

The individual fibers 16 comprising fiber optic bundle 10 may be secured at the linear input end 32 by any of a wide variety of devices capable of holding the light input ends 18 substantially co-planar with plane 24 (FIG. 1) and so that the portions covered with the light absorbing sheaths 36 are held substantially straight with no curves or bends. In one preferred embodiment, the input ends 18 of the fibers 16 are secured together at the linear input end 32 by "prepreg," an adhesive material commonly used to bond together individual layers of multi-layer printed wiring boards. More specifically, the optic fibers 16 may be arranged in a continuous line and "sandwiched" between two layers of prepreg. The prepreg may then be cured to bond together the optic fibers 16 in a continuous line, as best seen in FIGS. 1 and 2. The light input ends 18 of the fibers 16 may then be ground and lapped as necessary to make them co-planar with each other and with light input plane 24 (FIG. 1). Similarly, the light output ends 20 may be secured at the rectangular output end 30 by any of a wide variety of devices capable of holding the light output ends 20 substantially co-planar with each other and with plane 26 (FIG. 1) and in the desired rectangular arrangement. In one preferred embodiment, the light output ends 20 of the fibers 16 are secured together at the rectangular output end 30 by epoxy. Again, the light output ends 20 may be ground and lapped as required so that the ends 20 are co-planar with each other and with light output plane 28.

If the fiber optic bundle 10 is to be used with a two-dimensional photodetector array having a plurality of rectangular cells 72, then it is preferred that the area of each individual cell be substantially smaller than the area of the light output ends 20 of the optic fibers 16, as best seen in FIG. 8. Such an arrangement increases the coupling efficiency, i.e., the amount of light from the output end 20 of an optic fiber 16 that can be converted into a useful electrical signal. Consider, for example, the arrangement shown in FIG. 8 wherein the light output ends 20 of some of the optic fibers 16 forming the rectangular output end 30 are shown superimposed over the light sensitive cells 72 of the CCD 14. Those light sensitive cells 72 that receive light from two or more optic fibers 16 cannot be used to produce useful image data signals, since the light incident on such "shared" cells 72 (indicated by "X"'s in FIG. 8) originates from two different pixel portions of the scan line. Put another way, only those cells 72 that receive light from the output end 20 of a single fiber 16 produce data signals that are faithful to the image data received from that optic fiber 16. The locations of the shared cells 72 are programmed into the PROM 44 (FIG. 9), so that the control system 34 can ignore the output signals from any shared cells 72.

The collection efficiency referred to above increases as the ratio between the area of the output end 20 of the optic fiber 16 and the area of an individual cell increases. For example, in one preferred embodiment having optic fibers 16 with diameters of about 62.5 microns and cell dimensions of about 8.5 microns by 19.75 microns, the coupling efficiency is about 55%. That is, about 10 of the approximately 18.3 cells exposed to the output end 20 of the optic fiber 16 are not "shared" cells, thus produce useful image data. The data produced by the shared (X'd out) cells 72 are ignored by control system 34, as will be described below.

Figure 9:
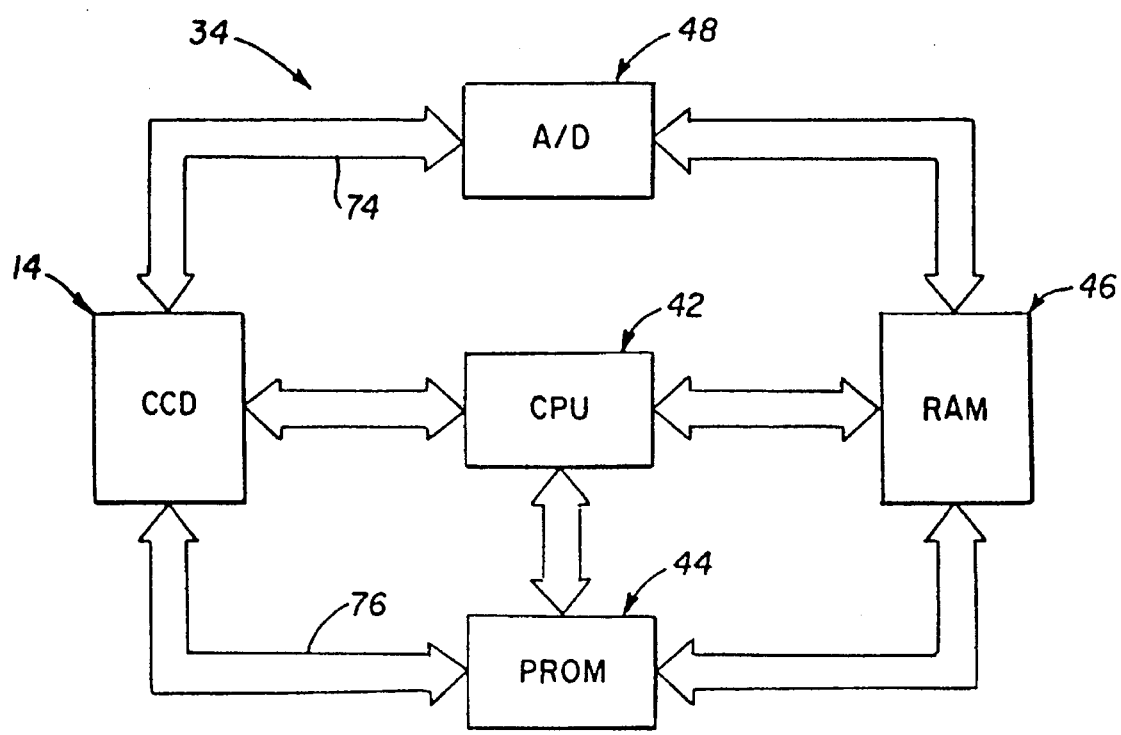
FIG. 9 is a block diagram of a control system for correlating the image data signals from the two-dimensional photosensor array.

The control system 34 for correlating data signals from the two-dimensional CCD array 14 is shown in FIG. 9 and comprises an analog-to-digital (A/D) converter 48 connected to the data bus 74 of CCD array 14. A/D converter 48 operates in a conventional manner to convert the analog signals received from the data bus 74 of CCD array 14 into digital signals that can be stored in a memory device, such as random access memory (RAM) 46. As was described above, the data signals received from the various cells 72 (FIG. 8) of the CCD array 14 do not directly correspond to related pixel portions of the illuminated scan line. Consequently, the control system 34 includes a programmable read-only memory (PROM) 44 that is connected to the address bus 76 of CCD array 14. The PROM 44 may be programmed during production and after a particular fiber optic bundle 10 is installed with a set of correlation parameters that will correlate the addresses of the individual cells 72 (FIG. 8) in the CCD array 14 with the contiguous address locations in RAM 46. A CPU 42 connected to the CCD array 14, PROM 44, and RAM 46 controls their operation so that the image data stored in RAM 46 emulates the image data that would normally be stored in RAM from a conventional linear photosensor array. Consequently, any downstream image processing apparatus (not shown) need not be changed from a configuration designed to work with scanning apparatus having a conventional linear photosensor.

In one preferred embodiment, the set of correlation parameters stored in the PROM 44 may be determined by scanning an object having a known configuration, such as a diagonal line drawn on a piece of paper. As the diagonal line is scanned, i.e., as the scan line is moved in the scan direction, the CCD array will detect dark spots corresponding to the location of particular sections of the diagonal line. Since the diagonal line has a known pitch, it is known where the detected dark spots should be at a given position along the scan direction. The location of the dark spot detected by the CCD is then compared with the known location of the dark portion of the line for that particular position along the scan direction. The PROM 44 is then programmed with the set of correlation parameters required to correlate the address locations of particular cells so that data therefrom is stored in RAM 46 as if it were received from a linear photosensor. That is, the image data will be stored in the RAM 46 in such a manner that it corresponds to adjacent pixels of the elongate scan line. The locations of shared cells are determined by continuously monitoring the output signal from each cell in the array as the line is being scanned. Those cells that are never fully illuminated are designated as shared cells 72. Similarly, if a cell responds several times to the illumination change caused by the diagonal line, then the cell is being illuminated by several fibers and is also designated as a shared cell 72.

It is contemplated that the inventive concepts herein described may be variously otherwise embodied and it is intended that the appended claims be construed to include alternative embodiments of the invention except insofar as limited by the prior art.

What is claimed is:

1. A fiber optic bundle for transmitting light from a source to a detector, said fiber optic bundle comprising a plurality of optic fibers, each of said plurality of optic fibers having a light input end and a light output end, the light input ends of said plurality of optic fibers being substantially coplanar with a first plane and arranged adjacent one another in a generally linear configuration so that the light input ends define a line contained within the first plane, and the light output ends of said plurality of optic fibers being substantially coplanar with a second plane and arranged adjacent one another in a generally rectangular configuration so that the light output ends define a rectangle contained within the second plane, wherein each of said plurality of optic fibers comprises:

a light transmitting core having a light input end and a light output end, said light transmitting core having a first index of refraction;

a light absorbing sheath surrounding said light transmitting core and extending from the light input end to a terminus, the terminus being located between the light input end and the light output end, said light absorbing sheath having a second index of refraction, the second index of refraction of said light absorbing sheath being greater than the first index of refraction of said light transmitting core; and a cladding surrounding said light transmitting core and extending from the terminus of said light absorbing sheath to the light output end of said light transmitting core, said cladding having a third index of refraction, the third index of refraction of said cladding being less than the first index of refraction of said light transmitting core.

2. The fiber optic bundle of claim 1, wherein said light transmitting core comprises optic grade glass.

3. An optic fiber, comprising:

a light transmitting core having a light input end and a light output end, said light transmitting core having a first index of refraction;

a light absorbing sheath surrounding said light transmitting core and extending from the light input end to a terminus, the terminus being located between the light input end and the light output end, said light absorbing sheath having a second index of refraction, the second index of refraction of said light absorbing sheath being greater than the first index of refraction of said light transmitting core; and a cladding surrounding said light transmitting core and extending from the terminus of said light absorbing sheath to the light output end of said light transmitting core, said cladding having a third index of refraction, the third index of refraction of said cladding being less than the first index of refraction of said light transmitting core.

4. The optic fiber of claim 3, wherein said light transmitting core comprises optic grade glass.

* * * * *